Feb. 2, 1960

E. C. HANNA 2,923,184

WORK HOLDING MECHANISM

Filed July 11, 1955

INVENTOR
EDWARD C. HANNA

BY *Strauch, Nolan & Diggins*

ATTORNEYS

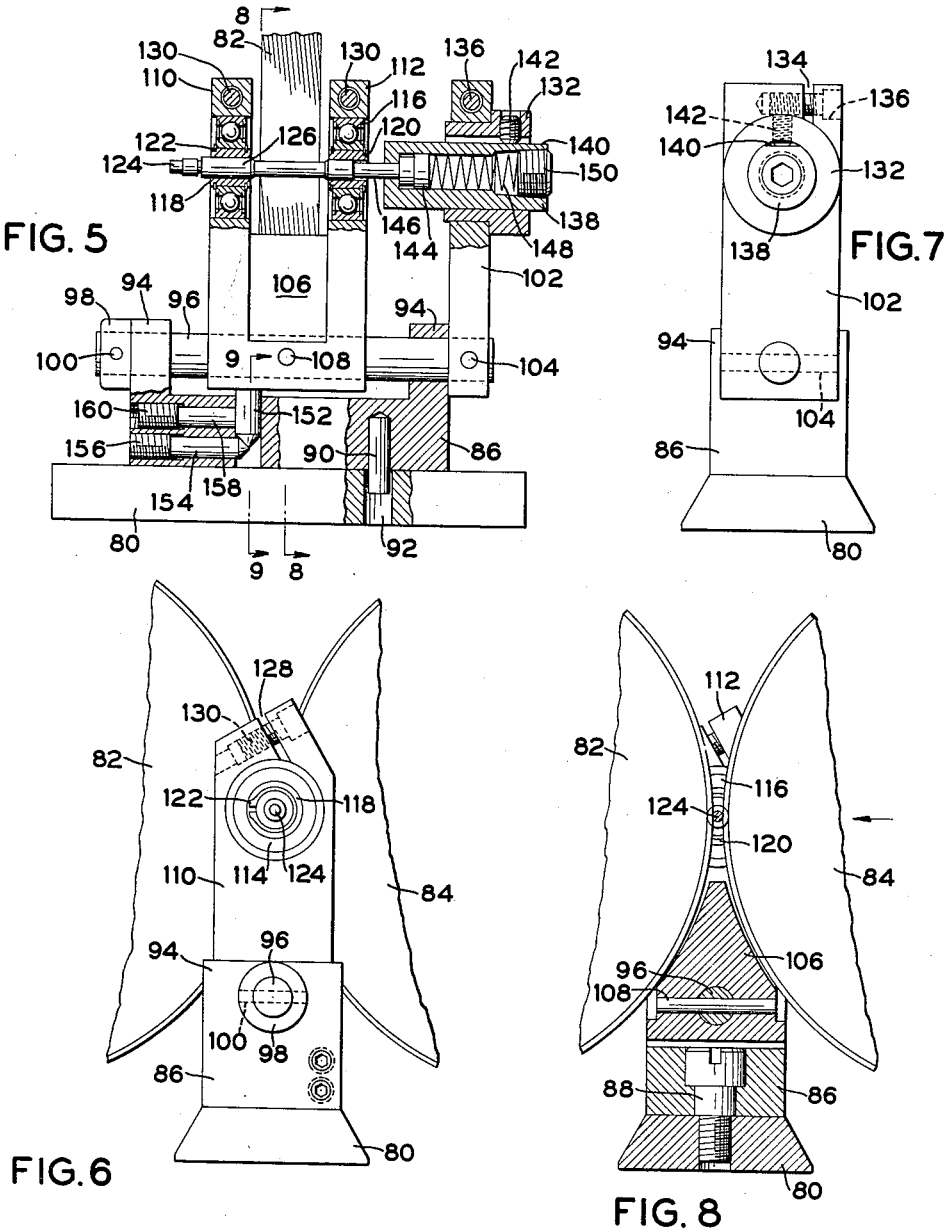

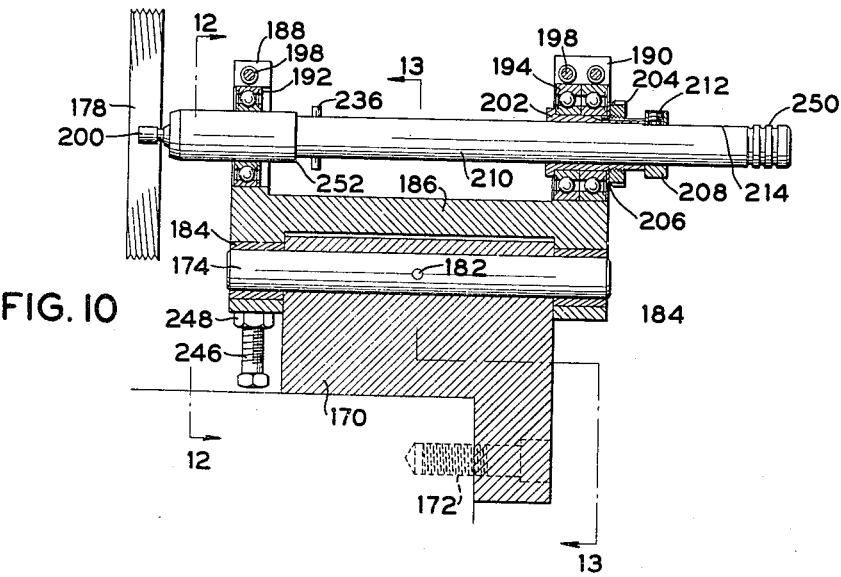
Feb. 2, 1960 — E. C. HANNA — 2,923,184
WORK HOLDING MECHANISM
Filed July 11, 1955 — 3 Sheets-Sheet 3
INVENTOR
EDWARD C. HANNA
BY Strauch, Nolan & Diggins
ATTORNEYS

United States Patent Office 2,923,184
Patented Feb. 2, 1960

2,923,184

WORK HOLDING MECHANISM

Edward C. Hanna, Waynesboro, Pa., assignor to Landis Machine Company, Waynesboro, Pa., a corporation of Pennsylvania Application July 11, 1955, Serial No. 520,974

2 Claims. (Cl. 80—6)

This invention relates to mechanisms for supporting work pieces in proper operative position, particularly on machine tools capable of performing grinding, rolling or the like operations on cylindrical work pieces.

In a typical machine of this kind, a work rest blade is usually provided to support the work piece upon its peripheral surface in proper relation with a pair of generally cylindrical rolling dies for rolling screw threads or similar profiles on the work pieces. As is well known, the work expands diametrically during the rolling operation with the result that its center gradually shifts in a direction away from the top surface of the work rest blade. In the case of ordinary screws, this shift of the work piece center is not objectionable. However, if only a small portion of the length of a work piece is to be thread rolled, the increase in diameter of the threaded portion will cause most of the work piece to rise from the surface of the work rest blade causing it to be inadequately supported. When the work is fed axially between the rolls the transition zone on the work between the blank diameter and the finished diameter cannot be properly supported by a work rest blade. The use of a work rest blade is impossible when rolling gears, splines, etc., due to the absence of a continuous supporting surface. Consequently, in the above and other situations, means other than a work rest blade must be devised to support the work.

As a partial solution to this problem it has been proposed to provide a fixture for supporting the work piece between centers in a manner similar to that employed on lathes. Such a device is disclosed in U.S. Patent No. 2,296,565. Experience has shown that a certain amount of elongation of the work piece occurs during rolling so that, when the work is confined between centers, as suggested in Patent No. 2,296,565, its free rotation is hampered by binding on the centers. In many cases, this elongation also leads to actual bending of the work piece. In the case of through-feed operations, the entire centering fixture must move axially, resulting in rapid wear and high replacement costs. Other disadvantages are that the length of the work piece is quite limited, that each work piece must be machined to receive the centers and that excessive time and labor are required to load the work in the fixture.

It is accordingly, the principal purpose and object of the present invention to provide improved mechanism for supporting work pieces during rolling forming operations which overcome the above-stated disadvantages of prior mechanisms.

In accordance with the present invention anti-friction bearing assemblies are provided to center the work accurately and yet leave it unconfined axially. Centering holes in the work piece are rendered unnecessary. In the case of through-feed operations, work pieces of any length can be rolled with ease and only the work piece moves axially, reducing wear on the fixture to a minimum. Also, in such operations, the work pieces may be passed between the rolling tools in a continuous series without the necessity of loading each piece individually between centers.

Another important object of the present invention is the provision of means to permit the work piece axis to deviate from a line parallel to the theoretical roll axes and thus to compensate for any possible misalignment of the die peripheries. It is an additional object to provide improved means for mounting the work supporting assembly for pivotal movement whereby the assembly is resiliently biased in one direction toward a positive stop so that, in infeed operations, when the movable rolling die is withdrawn, the work is removed from the stationary die and held in position determined by the stop.

It is also an object of the invention to provide work supporting and centering mechanisms for rotating-die rolling machines which engages the periphery of the work and which permits lateral movement of the work substantially in the plane containing the die axes.

It is another object of the invention to provide mechanism as described above in which the work piece or an arbor for holding the work piece is journalled in anti-friction bearings.

A further object is to provide supporting and centering means as above with an additional pivotal movement to permit the work piece to assume positions out of parallelism with the roll axes.

An additional object of the invention is to provide novel mechanisms for supporting work pieces for through-feed operations which engage the circumference of a work blank on the work-entrance side of the dies and the larger circumference of a finished work piece on the work exit side of the dies.

It is also an object to provide novel mechanisms for supporting work pieces which effectively locate and position the work pieces axially as well as laterally of the forming tools.

Other objects and advantages of the present invention will be apparent from the following description and the accompanying drawings in which:

Figure 5 is a side elevation, partially in section, of a second embodiment of the invention;

Figure 6 is a left end elevation of the parts shown in Figure 5;

Figure 7 is a right end elevation of the parts shown in Figure 5.

Figure 8 is a transverse vertical section along line 8—8 of Figure 5;

Figure 9 is a vertical section along line 9—9 of Figure 5;

Figure 10 is a vertical longitudinal section through a third embodiment of the invention;

Figure 11 is a central longitudinal section through the work socket shown in Figure 10;

Figure 12 is a vertical section along line 12—12 of Figure 10; and

Figure 13 is a vertical elevation partially in section along line 13—13 of Figure 10.

Figure 3:
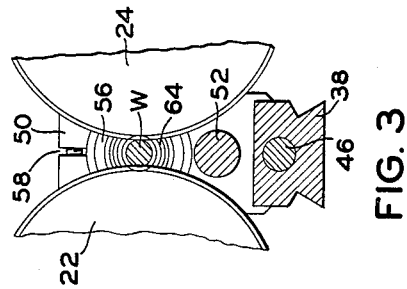
Figure 3 is a transverse vertical section along line 3—3 of Figure 1.

The exemplary embodiment of the invention shown in Figures 1–4 illustrates the basic work holding and centering device adapted for through-feed rolling. As shown, a base plate 20 is mounted between the usual pair of rolling dies 22 and 24 on the bed 26 of a typical thread rolling machine. The base plate 20 is secured at the front of bed 26 by means of screws 28 while the rear of the plate is anchored by a clamp 30 and screw 32. A dovetail slideway member 34 is secured to the top surface of base plate 20 by means of screws 36. A slide 38 is seated in the slideway 40 of member 34 and is stationarily clamped therein by a gib 42 and screws 44. When screws 44 are released the slide 38 may be adjusted longitudinally in the slideway 40 to place the mechanism in the correct position relative to the rolling dies in the axial direction.

A pivot shaft 46 is journalled longitudinally through the slide 38, parallel to the roll axes, and has reduced-diameter end portions protruding from both ends of the slide to receive a pair of supports 48 and 50. These flat, substantially rectangular supports 48 and 50 extend upwardly, perpendicular to the slide 38 on either side of the rolling dies 22 and 24 and to a point substantially beyond the axes of the dies. The supports are further braced and maintained at the proper spacing by a spacer rod 52, the reduced-diameter end portions of which pass through the supports 48 and 50 and have screws 54 threaded thereinto to retain the supports thereon. Preferably, as shown, the spacer rod 52 is located above the slide 38 and below the plane containing the axes of the rolling dies. For convenience the support members and the additional members such as 52 may be termed a frame assembly.

An anti-friction bearing 56 is mounted in each support 48 and 50, the axes of the bearings being accurately aligned with the roll axes and lying in the plane containing the roll axes. The upper ends of supports 48 and 50 are slotted as at 58 and the separated portions are joined by screws 60 to clamp the bearings firmly in the supports.

Figure 1:
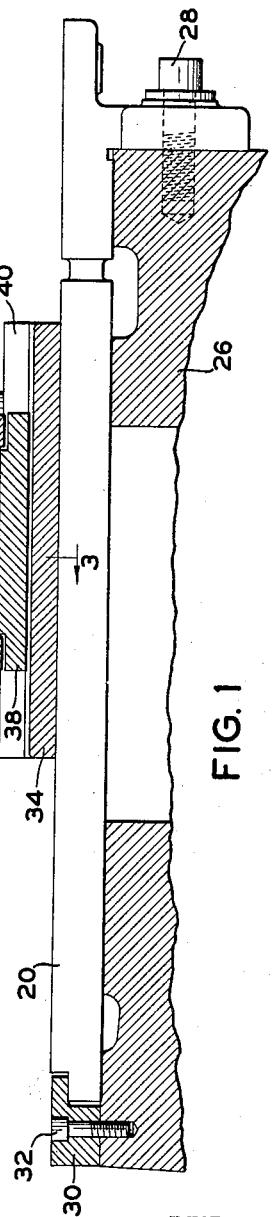
Figure 1 is a vertical longitudinal section of one embodiment of the invention as applied to a conventional thread rolling machine.

As stated above, a through-feed rolling operation is illustrated here. That is, the work is passed axially between the dies without displacing the axis of either of the dies. As seen in Figure 1, the work blank W enters from the right side. A bushing 62 is mounted in the inner race of the bearing 56 in support 48 to fit closely the circumference of the work blank and thus to support the work in the bearing. As the work progresses toward the left, it is engaged by the rolls and the desired profile (a screw thread, splines, or the like) is gradually formed to full depth. In this process the diameter of the work piece increases and bushing 64, mounted in the bearing 56 in support 50 is formed with a larger bore to accommodate the finished work as it leaves the dies. The bushings 62 and 64 thus provide a virtually frictionless journal for rotation of the work during rolling. The customary spring clips 65 may be employed to retain the bushings 62 and 64 in the bearings 56. It will be seen that no part of the supporting mechanism partakes of the axial movement of the work.

Figure 4:
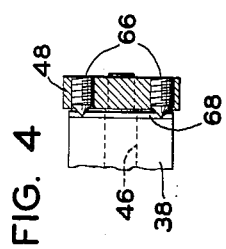
Figure 4 is a horizontal section taken along line 4—4 of Figure 1.
Figure 2:
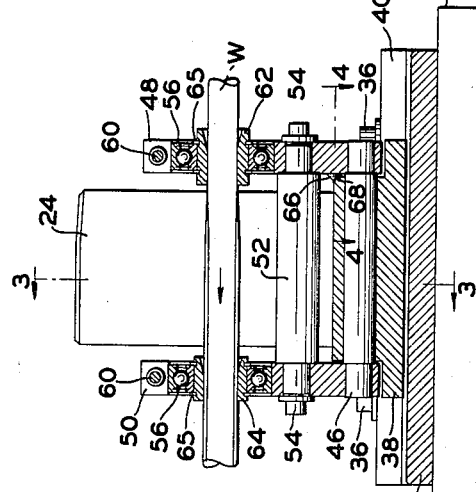
Figure 2 is an end elevation of the mechanism shown in Figure 1.
Figure 2:
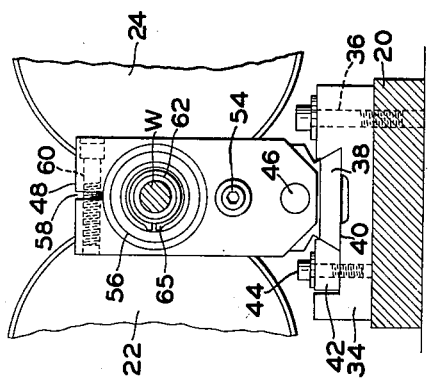

The purpose of the pivotal mounting of the frame assembly including the supports 48 and 50 is to permit the work piece to move laterally during infeed rolling operations. Since this is not required in the present instance provision is made to selectively present the pivotal movement of the frame assembly about the shaft 46. As seen in Figures 1 and 4, a pair of horizontally directed cone-pointed screws 66 are disposed one on each side of the pivot shaft 46, being threaded through the support 48 to engage a bevel 68 formed on the front top edge of slide 38. Thus, when both screws 66 are tightened against the bevel 68, the support 48 will be rigidly fixed in an upright position without possibility of pivotal movement. If desired pivotal movement of the frame assembly may be obtained by loosening the screws. The position of the loose support 50 will naturally conform to that of the fixed support 48.

Figures 5 through 9 illustrate a similar supporting and centering device particularly adapted for use in infeed rolling operations. This embodiment of the invention includes a slide 80 mounted between a pair of rolling dies 82 and 84 in the same manner as in the first embodiment, the remaining supporting parts being the same as those shown in Figures 1 through 4. A pivot base 86 is secured to the top of slide 80 by a shoulder screw 88 (Figure 8). A pin 90 is imbedded in the bottom of base 86 and extends downwardly into an opening 92 in the slide 80. A substantial clearance between pin 90 and opening 92 permits a limited amount of pivotal movement of base 86 on slide 80 with the screw 88 as the pivot. The base 86 is provided with an upwardly projecting portion 94 at each end and a shaft 96 is journalled through these portions 94 so as to lie parallel to the axes of rolls 82 and 84. Externally of one of the portions 94 a collar 98 is secured upon shaft 96 by a pin 100. An end plate 102 is similarly secured by a pin 104 to the opposite end of shaft 96 externally of the other portion 94. The shaft 96 is thus restrained against axial movement in either direction.

A frame assembly 106 is mounted on shaft 96 between the two end portions 94 of the base 86 and is fixed against movement relative to shaft 96 by a pin 108. The frame 106 has two arms 110 and 112 extending upwardly, one on each side of the pair of rolling dies 82 and 84, while the central portion of the frame is suitably recessed to clear the rolling dies when in operating position as shown in Figure 8. A pair of anti-friction bearings 114 and 116 are mounted in the arms 110 and 112 respectively and are axially aligned with each other, their common axis lying in the plane containing the roll axes. A pair of bushings 118 and 120, respectively, are mounted in the inner races of bearings 114 and 116 by means of spring clips 122. The bushings 118 and 120 are designed to support and center the work piece 124 in position to be rolled. In the instance shown, the work piece has a cylindrical surface 126 slightly larger than the diameter of the finish-rolled profile. That is, of course, a necessary condition to the use of this particular form of support, since otherwise the finished work piece could not be withdrawn axially from the bushings 118 and 120. The arms 110 and 112 are slotted as at 128 and the separate portions are joined by screws 130 to clamp the bearings 114 and 116 firmly in place.

Since in this case each work piece must be individually positioned, the mechanism includes means for locating the work axially. The end plate 102 is provided with an opening axially aligned with the bushings 118 and 120 to receive a shouldered bushing 132. The top of plate 102 is slotted at 134 and the separate portions are joined by a screw 136 to clamp the bushing 132 firmly in place. A sleeve 138 is mounted in bushing 132 and has a flat side 140 for engagement by a clamping screw 142 which is threaded radially through one wall of the bushing. A plug 144 is seated in the bottom of the interior of sleeve 138 and has a reduced-diameter portion 146 extending through an opening in the bottom wall of the sleeve to contact one end of the work piece. The plug 144 is resiliently held in this axial position by means of a compression spring 148 mounted in the bore of the sleeve 138 and retained therein by a plug 150 threaded into the end of the sleeve. The end surface of protruding plug portion 146 determines the axial location of work piece 124 when it is inserted into the mechanism. The plug 144 is resiliently backed to provide for the small amount of endwise movement of the work which is usually necessary in thread rolling. The initial location of the plug is adjustable by means of the screw 142.

The rocking movement of the frame assembly 106, plate 102 and associated parts about the shaft 96 is limited by the means now to be described. A pin 152 is disposed in a vertical opening in the base member 86 and has a conical bottom end engaged by a horizontally directed cone-pointed pin 154 which is retained in position by a set screw 156. As locking means another pin 158 is provided to engage the periphery of pin 152 and is abutted by a set screw 160. Thus, the vertical position of pin 152 can be adjusted to permit varying degrees of rocking movement of the frame assembly 106. On the opposite side of the pivot shaft 96 from the pin 152, a spring 162 is disposed in a suitable opening in base member 86 and is in compression between the bottom of that opening and the bottom surface of frame assembly 106.

In the operation of the machine, the roll 84 is moved toward roll 82 as indicated by the arrow in Figure 8. As the rolling operation proceeds, the work axis is also shifted somewhat to the left, such movement being permitted by the pivotal movement of the frame 106. As the frame rocks about shaft 96, the spring 162 is compressed and when the operation is completed this spring expands to remove the work piece from engagement with the stationary die. The frame 106 with the work piece 124 rocks clockwise until arrested by the adjustable positive stop 152, thus preventing the work piece from re-engaging the threads on roll 84. Consequently the work piece is held in the open space between the dies and can readily be withdrawn axially from the bushings 118 and 120.

A third exemplary embodiment of the invention is shown in Figures 10 through 13. In this case a base member 170 is secured to the forward top corner of the machine bed 26 by screws 172. A pivot shaft 174 is journalled through the top of base member 170, with its axis substantially midway between the axes of the rolling dies 176 and 178 and parallel thereto. The shaft 174 is secured against rotation and axial movement by a set screw 180 threaded through one side of the base member 170 and engaging a small recess 182 in the periphery of shaft 174. The shaft 174 extends beyond the base member 170 at both ends. A pair of bushings 184 is mounted on the ends of shaft 174 to serve as bearings for a frame assembly 186 having upstanding arms 188 and 190 at its opposite ends. As before the arms 188 and 190 are bored to receive anti-friction bearings 192 and 194 respectively which are axially aligned with each other and whose axes lie in the plane containing the roll axes. The arms 188 and 190 are slotted at 196 and the separate portions are joined by screws 198 to clamp the bearings firmly in place. It will be noted that both arms 188 and 190 are located forwardly of the rolling dies 176 and 178.

Since in this case the bearings 194 are combination radial and thrust bearings, a means is provided to hold the inner races together axially, comprising a shouldered bushing 202 journalled within the bearings and having one end threaded to receive the conventional lock nut 204 and lock washer 206. Thus the bearings 194 are held against the shoulder of bushing 202 by the lock nut and washer. The bushing 202 extends beyond the lock nut 204 to form a stop for a collar 208 surrounding a work holding spindle 210 which is journalled for rotation in bearing 192 and bushing 202. A set screw 212 threaded radially through one side of the collar 208 engages a flat 214 on one side of spindle 210 to lock the collar thereon in adjusted axial position.

A cylindrical opening 216 is formed in the forward end of the spindle 210 to receive an ejector plug 218 and a cylindrical member 220. The member 220 is stationarily secured in the opening 216 by a pair of pins 221 (Figure 12). The member 220 supports the work piece 200 in a rearwardly facing bore 222. An opening 224 is provided in one side wall of member 220 to admit a projection 226 which engages an annular groove 228 in the work piece 200. The projection 226 is stationarily secured as by brazing to a leaf spring 230 extending axially of cylinder 220 in a shallow recess on the periphery thereof and being secured thereto by a screw 232.

The cylindrical member 220 is provided with a smaller bore extending from the bore 222 to the forward end of the member 220 to permit passage therethrough of an ejector pin 234. The pin 234 is pressed into the reduced-diameter rearward end of the ejector plug 218 and moves axially therewith in the opening 216. A transverse pin 236 is passed through the plug 218 and longitudinal slots 238 in the spindle 210. A spring 240 is held in compression between the cylindrical member 220 and ejector plug 218, surrounding the reduced-diameter rearward end of the latter. The plug 218 is thus urged forwardly toward the bottom of the opening 216 and its travel in this direction is limited by contact of the pin 236 with the forward end of the slot 238. In this position, as shown in Figure 11, the ejector pin 234 is withdrawn forwardly to permit insertion of the work piece 200.

It will be seen that the frame assembly 186 and the parts carried thereby are rockable about the pivot shaft 174. In the operation of the device, the reciprocating die 178 forces the work piece 200 toward the right as viewed in Figure 12 while the profile is being formed on the work. As the frame 186 is thus rocked clockwise, a spring 242 is compressed. This spring is mounted on a pin 244 pressed in the bottom of the overhanging forward portion of frame 186 and is held in compression against the top surface of the machine bed. After completion of the rolling operation, the rolling die 178 is withdrawn to the left and the spring 242 expands to disengage the newly formed profile on the work from the profile of die 176, rocking the frame 186 in the counter-clockwise direction.

This movement of the frame 186 is arrested by a screw 246 threaded into the bottom of the overhanging forward portion of frame 186 on the other side of the pivot shaft 174 from the spring 242. The screw 246 contacts with its head the top surface of the bed 26 to limit the rocking movement of the frame 186 and a nut 248 is provided to lock the screw 246 in adjusted position. When the rocking movement of the frame 186 is arrested by screw 246, continued withdrawal of the die 178 will disengage its profile from that of the work leaving the work 200 free to be withdrawn axially.

The forward end of the spindle 210 may be provided with any suitable means 250 to enable it to be pulled forward manually. When this is done the pin 236 is brought into contact with the rearward end surface of bushing 202. The pin 236 is moved rearwardly relative to the spindle 210 carrying with it the ejector plug 218 and compressing the spring 240. The forward movement of spindle 210 is arrested by contact of a shoulder 252 thereon with the bushing 202. The relative rearward movement of plug 218 forces the ejector pin 234 to push the finished work piece out of the cylindrical member 220, the inclined sides of groove 228 in the work serving to displace the plug 226 from the groove to permit axial movement of the work. After removal of the work, the spindle 210 is again moved to the left by hand, the springs 230 and 240 return the parts to the position shown in Figure 11 and new work blank may be inserted.

From the foregoing it will be apparent that the above-stated objects of the invention have been obtained by the provision of novel work holding devices of simple, rugged construction, which have an extended service life, and which facilitate the operation of the forming machine with which they are associated and thereby increase production rates.

I claim:

1. A holder for positioning work pieces while they are being formed by rotation between a pair of rolls comprising a frame assembly having a pair of spaced support members normally disposed in planes normal to the axis of said rolls; means journalling said frame assembly for movement about an axis parallel to and spaced from the plane of the axis of said rolls; resilient means adapted to urge said frame assembly about said pivot axis in one direction; means adjustably limiting the movement produced by said resilient means comprising a stop pin engageable by a portion of said frame assembly after limited movement of said assembly about said pivot axis, said pin having a cone point, and a set screw having a cone point engageable with the cone point of said pin to adjustably position said pin and thereby adjustably limit the pivotal movement of said frame assembly; aligned anti-friction bearing assemblies mounted in said support members; and bushings having through bores concentric with an axis in a plane containing the roll axes and engageable with the outer surface of said work piece to support said work piece for free rotation between said rolls.

2. The holder according to claim 1 together with a plunger mounted in alignment with said bearing assemblies and adapted to extend toward one of said bearing assemblies from the outer side thereof to contact the end of a work piece positioned therein and thereby determine the axial position of said work piece.

References Cited in the file of this patent

UNITED STATES PATENTS

| | | |
|---|---|---|
| 245,756 | Webb | Aug. 16, 1881 |
| 663,455 | Muehlberg | Dec. 11, 1900 |
| 1,017,881 | Landis | Feb. 20, 1912 |
| 1,778,032 | Kirsch et al. | Oct. 14, 1930 |
| 2,257,253 | Wemhoner | Sept. 30, 1941 |
| 2,296,565 | Matze | Sept. 22, 1942 |
| 2,342,817 | Plagemann | Feb. 29, 1944 |
| 2,700,314 | Watkins | Jan. 25, 1955 |
| 2,701,484 | Bedker | Feb. 8, 1955 |

FOREIGN PATENTS

| | | |
|---|---|---|
| 499,277 | Great Britain | Jan. 20, 1939 |